(12) United States Patent
Madjlesi

(10) Patent No.: US 11,485,507 B2
(45) Date of Patent: Nov. 1, 2022

(54) THRUST LINK WITH TUNED ABSORBER

(71) Applicant: BOMBARDIER INC., Dorval (CA)

(72) Inventor: Abdolreza Madjlesi, Thornhill (CA)

(73) Assignee: BOMBARDIER INC., Dorval (CA)

( * ) Notice: Subject to any disclaimer, the term of this patent is extended or adjusted under 35 U.S.C. 154(b) by 72 days.

(21) Appl. No.: 16/470,754

(22) PCT Filed: Dec. 13, 2017

(86) PCT No.: PCT/IB2017/057911
§ 371 (c)(1),
(2) Date: Jun. 18, 2019

(87) PCT Pub. No.: WO2018/116083
PCT Pub. Date: Jun. 28, 2018

(65) Prior Publication Data
US 2019/0329895 A1 Oct. 31, 2019

Related U.S. Application Data

(60) Provisional application No. 62/436,535, filed on Dec. 20, 2016.

(51) Int. Cl.
*B64D 27/26* (2006.01)
*F16F 7/108* (2006.01)

(52) U.S. Cl.
CPC .............. *B64D 27/26* (2013.01); *F16F 7/108* (2013.01); *B64D 2027/268* (2013.01); *F16F 2222/08* (2013.01)

(58) Field of Classification Search
CPC .............. B64D 27/26; B64D 2027/268; B64D 2222/08; F16F 7/108
(Continued)

(56) References Cited

U.S. PATENT DOCUMENTS 3,075,406 A * 1/1963 Butler, Jr. ............ F16F 15/1442
74/574.4
4,998,345 A * 3/1991 Funahashi ............... F16F 13/14
248/562
(Continued)

FOREIGN PATENT DOCUMENTS

EP 0429100 A1 5/1991
EP 1378444 A1 1/2004
(Continued)

OTHER PUBLICATIONS

PCT International Search Report and Written Opinion dated Mar. 5, 2018 re: International Application No. PCT/IB2017/057911.

*Primary Examiner* — Christopher Garft
*Assistant Examiner* — Michael McDuffie
(74) *Attorney, Agent, or Firm* — Norton Rose Fulbright Canada LLP

(57) ABSTRACT

An assembly for connecting an engine to an aircraft, including a first support configured to be structurally connected to the engine, a second support configured to be structurally connected to the aircraft, and a thrust link. The thrust link includes a load transferring member having opposed ends each connected to a respective one of the supports for transferring engine thrust loads from the engine to the aircraft along a longitudinal axis of the load transferring member. The opposed ends have a fixed position relative to each other. The thrust link further includes a tuned absorber coupled to the load transferring member intermediate the opposed ends. The tuned absorber is tuned to absorb engine noise of at least one predetermined frequency. A thrust link and a method for reducing a transfer of noise generated by the engine to the aircraft are also discussed.

12 Claims, 7 Drawing Sheets

(58) Field of Classification Search
USPC .......... 244/54; 248/554, 555, 556, 557, 636;
60/FOR. 114
See application file for complete search history.

(56) References Cited

U.S. PATENT DOCUMENTS

| | | | | |
|---|---|---|---|---|
| 5,056,763 | A * | 10/1991 | Hamada | F16F 15/1442 267/141 |
| 5,065,959 | A * | 11/1991 | Bhatia | B64D 27/18 244/54 |
| 5,174,552 | A * | 12/1992 | Hodgson | B64D 27/26 180/300 |
| 5,326,324 | A * | 7/1994 | Hamada | F16F 15/1442 464/180 |
| 5,413,318 | A * | 5/1995 | Andreassen | B23B 29/022 267/140 |
| 5,915,503 | A | 6/1999 | Enright | |
| 6,065,742 | A * | 5/2000 | Whiteford | F16F 7/108 188/378 |
| 6,212,974 | B1 * | 4/2001 | Van Duyn | F16F 7/00 74/606 R |
| 6,241,062 | B1 | 6/2001 | Enright | |
| 6,330,985 | B1 | 12/2001 | Manteiga et al. | |
| 6,370,756 | B1 * | 4/2002 | Conger | F16C 3/023 29/423 |
| 6,607,165 | B1 * | 8/2003 | Manteiga | B64D 27/18 244/54 |
| 6,725,985 | B2 * | 4/2004 | Haneishi | F16F 15/1442 188/379 |
| 7,192,357 | B2 * | 3/2007 | Kawakami | F16F 15/1414 188/379 |
| 8,020,831 | B2 | 9/2011 | Dron et al. | |
| 8,348,191 | B2 * | 1/2013 | West | B64D 27/26 244/54 |
| 8,863,390 | B1 * | 10/2014 | Ley | F16C 3/023 29/897.2 |
| 2010/0116965 | A1 * | 5/2010 | McGuire | B64D 27/26 248/557 |
| 2013/0160459 | A1 * | 6/2013 | Thies | B64D 33/00 60/796 |
| 2016/0280381 | A1 * | 9/2016 | Zameroski | B64D 27/26 |
| 2018/0298978 | A1 * | 10/2018 | Ludin | F16F 1/445 |

FOREIGN PATENT DOCUMENTS

| | | |
|---|---|---|
| EP | 2008933 A1 | 12/2008 |
| WO | 9712160 A1 | 4/1997 |

* cited by examiner

THRUST LINK WITH TUNED ABSORBER

CROSS-REFERENCE TO RELATED APPLICATIONS

This application is a national phase application under 35 U.S.C. 371 of International Patent Application No. PCT/IB2017/057911 filed on Dec. 13, 2017, which claims priority from U.S. provisional application No. 62/436,535 filed Dec. 20, 2016, the entire contents of which are incorporated by reference herein.

TECHNICAL FIELD

The application relates generally to noise absorption and, more particularly, to absorption of noise transmitted from an engine to an aircraft.

BACKGROUND OF THE ART

Thrust links are used to structurally connect an engine to an aircraft for transferring engine thrust loads to the aircraft. Typically, a thrust link is a longitudinally extending member disposed between an engine casing and either a fuselage or a wing of the aircraft.

The thrust link provides a dominant path for transferring dynamic loads from the engine to the fuselage, and the dynamic loads are a source of undesirable noise in the aircraft cabin. Typically, the dynamic loads are created by rotating imbalance of blades attached to fan and core shafts of the engine.

SUMMARY

In one aspect, there is provided an assembly for connecting an engine to an aircraft, comprising: a first support configured to be structurally connected to the engine; a second support configured to be structurally connected to the aircraft; and a thrust link including: a load transferring member having opposed ends each connected to a respective one of the first and second supports for transferring engine thrust loads from the engine to the aircraft along a longitudinal axis of the load transferring member, the opposed ends having a fixed position relative to each other, and a tuned absorber coupled to the load transferring member intermediate the opposed ends, the tuned absorber tuned to absorb engine noise of at least one predetermined frequency.

In a particular embodiment, the tuned absorber has a damping member operatively coupled to the load transferring member and movable relative to the load transferring member at least along the longitudinal axis.

In a particular embodiment, the damping member is hollow and disposed around the load transferring member, the tuned absorber further comprising a viscoelastic layer connected to the damping member and to the load transferring member.

In a particular embodiment, the damping member is disposed within a hollow portion of the load transferring member, and wherein the hollow portion is filled with a viscous fluid operatively coupling the damping member to an inner surface of the load transferring member.

In a particular embodiment, the damping member is disposed within a hollow portion of the load transferring member, the tuned absorber further comprising a viscoelastic layer interconnecting the damping member and the load transferring member.

In a particular embodiment, the tuned absorber includes two bodies operatively coupled to the load transferring member and tuned to absorb noise of a respective one of two different predetermined frequencies. The two bodies may have different masses. The two bodies may be connected to the load transferring member through a respective one of two viscoelastic layers having different properties.

In a particular embodiment, the damping member is movable relative to the load transferring member along three directions perpendicular relative to each other.

In a particular embodiment, the predetermined frequency is at least 50 Hz.

In another aspect, there is provided a thrust link for transferring engine thrust loads from an engine to an aircraft, comprising: a load transferring member having opposed ends configured for respectively engaging engine and aircraft supports to transfer engine thrust loads from the engine to the aircraft along a longitudinal axis of the load transferring member, the ends having a fixed position relative to each other; and a tuned absorber having a damping member operatively coupled to the load transferring member and movable relative to the load transferring member at least along the longitudinal axis to absorb noise of at least one predetermined frequency.

In a particular embodiment, the damping member is hollow and disposed around the load transferring member, the tuned absorber further comprising a viscoelastic layer connected to the damping member and to the load transferring member.

In a particular embodiment, the damping member is disposed within a hollow portion of the load transferring member, and wherein the hollow portion is filled with a viscous fluid operatively coupling the damping member to an inner surface of the load transferring member.

In a particular embodiment, the damping member is disposed within a hollow portion of the load transferring member, the tuned absorber further comprising a viscoelastic layer interconnecting the damping member and the load transferring member.

In a particular embodiment, the damping member includes two bodies operatively coupled to the load transferring member and tuned to absorb noise of a respective one of two different predetermined frequencies.

In a particular embodiment, the predetermined frequency is at least 50 Hz.

In a further aspect, there is provided a method for reducing a transfer of noise generated by an engine to an aircraft, the engine connected to the aircraft through a thrust link having opposed ends, the method comprising: coupling a tuned absorber to a load transferring member of the thrust link intermediate the opposed ends, the load transferring member being configured for transferring thrust loads from the engine to the aircraft between the opposed ends; and configuring the tuned absorber to be tuned to absorb at least one predetermined frequency of the noise from the engine.

In a particular embodiment, configuring the tuned absorber comprises selecting a mass of a damping member of the tuned absorber, the damping member operatively connected to the load transferring member.

In a particular embodiment, configuring the tuned absorber comprises selecting properties of a viscoelastic layer connecting a damping member of the tuned absorber to the load transferring member.

In a particular embodiment, configuring the tuned absorber comprises selecting properties of a viscous fluid operatively coupling a damping member of the tuned absorber to the load transferring member.

DESCRIPTION OF THE DRAWINGS

For a better understanding of the present invention, as well as other aspects and further features thereof, reference is made to the following description which is to be used in conjunction with the accompanying drawings, where:

FIG. 4b is a cross-sectional view along line 4b-4b of FIG. 4a;

FIG. 5b is a cross-sectional view along line 5b-5b of FIG. 5a;

FIG. 6b is a cross-sectional view along line 6b-6b of FIG. 6a; and

Figure 1:
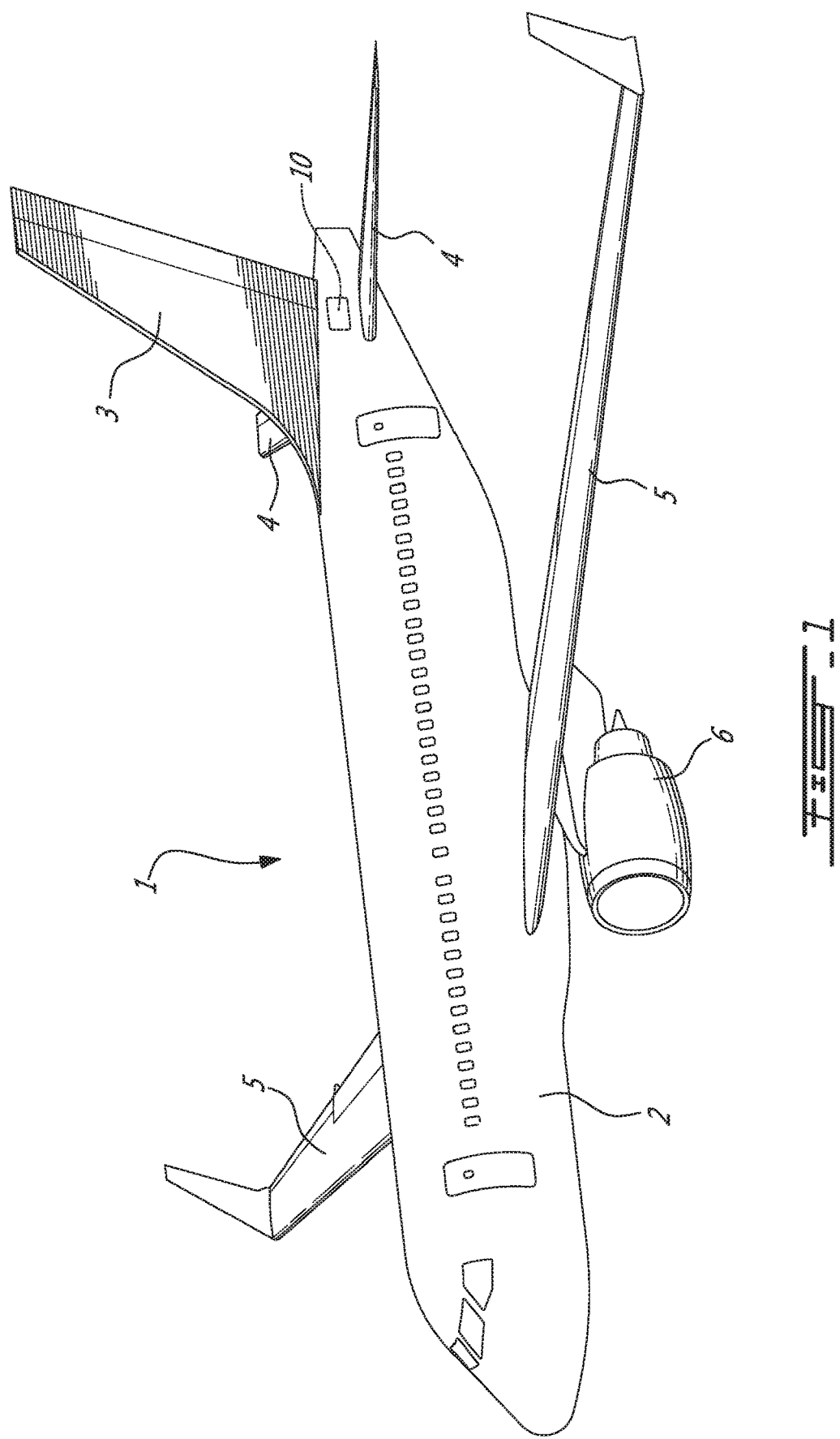
FIG. 1 is a tridimensional view of an aircraft.

In the drawings, embodiments of the invention are illustrated by way of example. It is to be expressly understood that the description and drawings are only for purposes of illustration and as an aid to understanding. They are not intended to be a definition of the limits of the invention.

DETAILED DESCRIPTION

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

Figure 2:
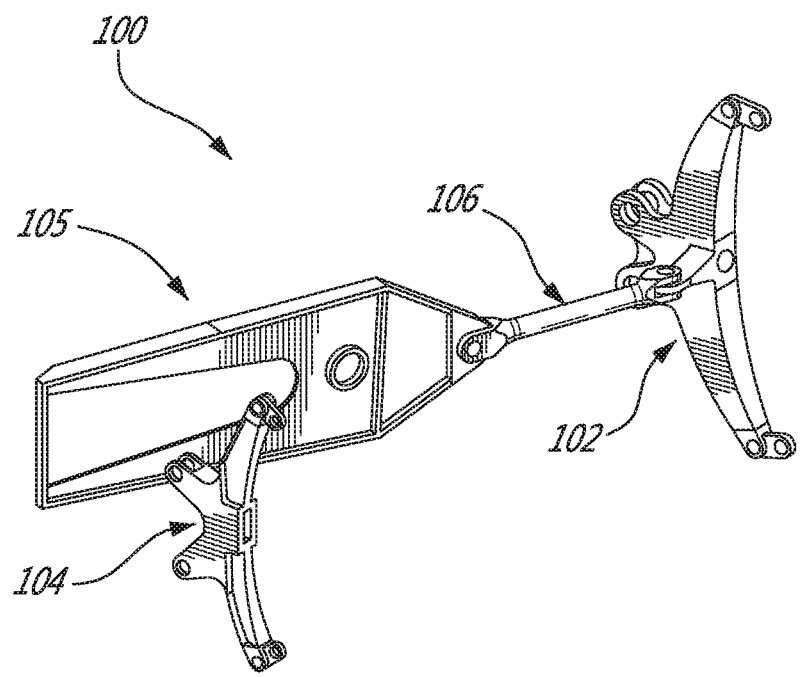
FIG. 2 is a tridimensional view of a system which may be used for attaching an engine to a fuselage of an aircraft such as shown in FIG. 1.

Referring to FIG. 2, an assembly 100 used to attach an engine 6 to a fuselage 2 of the aircraft 1 in accordance with a particular embodiment is generally shown. The assembly 100 comprises a forward support or yoke 102, an aft support or yoke 104, and a thrust link 106. The yokes 102 and 104 are connected to the engine 6. In the embodiment shown, the aft yoke 104 is configured to be directly connected to a beam or other suitable structure (not shown) of the aircraft 1. A thrust link 106 structurally connects the forward yoke 102 to another support 105, shown here in the form of a support plate, that is also configured to be directly connected to a beam or other suitable structure (not shown) of the aircraft 1, so as to provide the connection between the forward yoke 102 and the aircraft 1.

Figure 3:
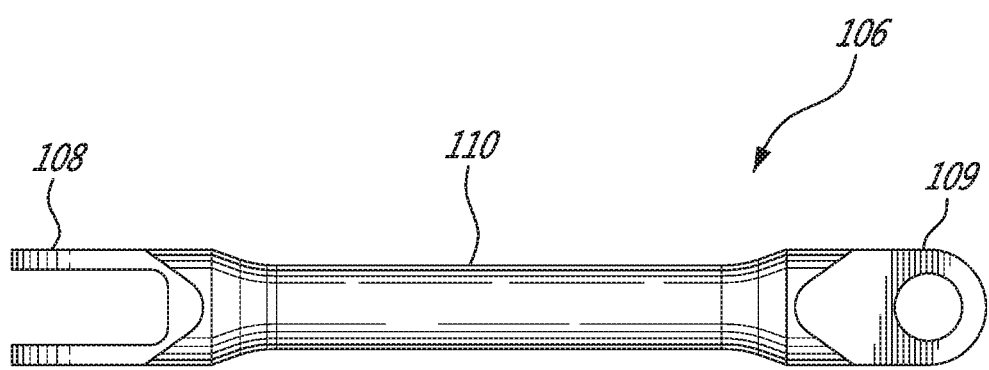
FIG. 3 is a side view of a thrust link of the system of FIG. 2 in accordance with a particular embodiment.

Referring to FIG. 3, the thrust link 106 comprises a load transferring member 110 in the form of a rod, extending between and connected to (e.g. integrally formed with) two opposite ends 108 and 109. The ends 108 and 109 are configured for engaging corresponding features defined by the forward yoke 102 and the support plate 105. In one embodiment, both ends 108 and 109 are pivotally engaged to the corresponding features, and accordingly each include spaced apart arms having aligned holes defined therethrough for receiving a pivot. Others suitable means of attachment of the thrust link may alternately be used. In a particular embodiment, the load transferring member 110 is a metal rod. However, any other suitable material may be used.

The load transferring member 110 is configured for transferring engine thrust loads from the engine 6 to the aircraft 1. The load transferring member 110 has a structural integrity adapted to withstand the thrust loads such that the ends 108 and 109 have a fixed position relative to each other. The load transferring member 110 in the embodiment shown has a cylindrical cross-section; other suitable cross-sections may alternately be used.

The structural connection between the engine 6 and the fuselage 2 provides a travelling path for the dynamic loads produced by the engine 6. Such dynamic loads are known to generate noise in the cabin which is unpleasant for the passengers. For example, rotating or vibrating components of the engine 6 can produce tonal noise. Tonal noise can be defined by a noise concentrated in a narrow part of the spectrum or containing a high proportion of energy at a single frequency or within a limited frequency range—as opposed to non-tonal noise which is typically spread over a wide band of frequencies. Tonal noise is generally more noticeable than non-tonal noise of the same level, and accordingly dampening of the tonal noise within the aircraft cabin is desirable.

Tonal noise generated by rotating components has a predictable frequency which depends on the rotational speed and structure of the rotating components. For example, the engine 6 may include low pressure and high pressure rotatable shafts producing tonal noise at different frequencies, these frequencies being affected by the number of blades connected to the shaft, vanes interacting with the flow, etc. Other rotatable engine components may also produce tonal noise, for example gearboxes.

In the present specification, a tuned absorber is provided on the load transferring member 110 of the thrust link 106 intermediate its ends 108, 109 to reduce noise at particular frequencies, for example frequencies corresponding to the tonal noise generated by shaft(s) (e.g. fan and/or core shafts) of the engine 6. In some embodiments, the tuned absorber as a whole is not visible from outside of the load transferring member 110. In other embodiments, the tuned absorber may be disposed around the load transferring member 110 and accordingly is visible. Such embodiment allows inspection over time and replacement of the tuned absorber without having to replace the thrust link 106.

The term "tuned absorber" as used herein is intended to include any apparatus that is tuned to absorb noise at a specific frequency. Non-limiting examples of tuned absorbers are provided in the exemplary embodiments described below.

The tuned absorber comprises a damping member and a damping material coupling the damping member to the load transferring member of the thrust link. The damping member may comprise more than one body. In the illustrated embodiments that will be detailed below, the members are either an internal body or an external body. The damping member may comprise any number of bodies depending of the number of frequency that needs to be absorbed.

The thrust link 106 is free of any structural mode in the frequency range of the engine. In a particular embodiment, the load transferring member 110 in isolation is already free of any structural mode in the frequency range of the engine. In an alternate embodiment, a structural mode of the isolated load transferring member 110 is within the frequency range of the engine, but the coupling of the damping member to the load transferring member 110 pushes the structural mode of the combined elements outside the frequency range of the engine, in addition to the damping member acting to reduce noise at particular frequencies (e.g. by dampening the dynamic loads of the fan and/or core shaft of the engine).

Figure 4A:
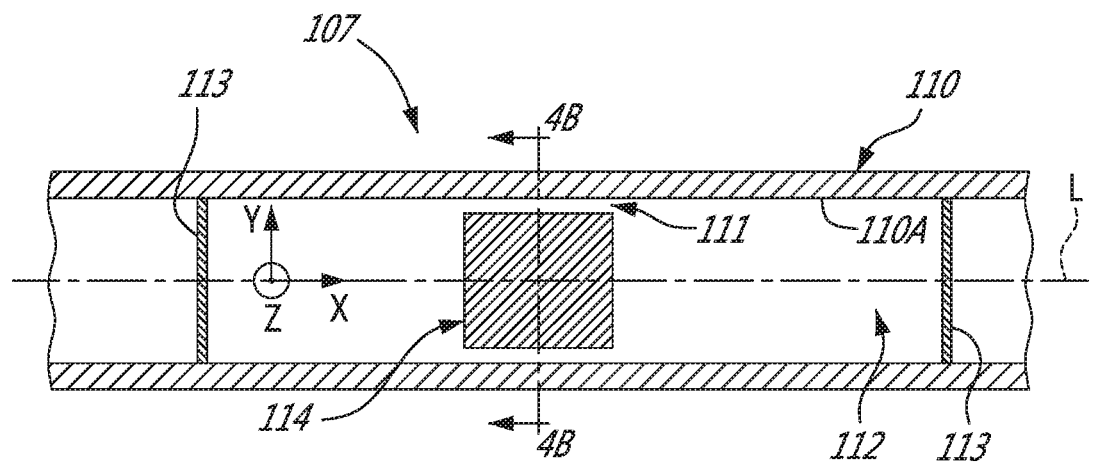
FIG. 4a is a longitudinal cross-sectional view of a portion of the thrust link of FIG. 3 in accordance with a particular embodiment.
Figure 4B:
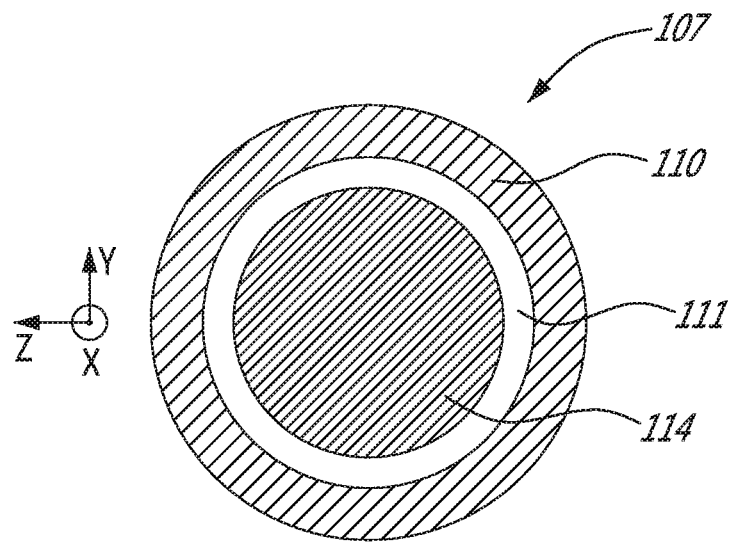

Referring to FIGS. 4a and 4b, a particular embodiment of a tuned absorber 107 is shown. In this embodiment, the load transferring member 110 includes a longitudinally extending cylindrical hollow portion 112 defined between internal walls 113 extending transversely within the load transferring member 110. The tuned absorber 107 includes an internal body 114 received within the hollow portion 112. The internal body 114 has a cylindrical shape with a cross-section having a diameter inferior to a diameter of the cross-section of the hollow portion 112, to create an annular gap 111 between the internal body 114 and an inner circumferential surface 110A of the load transferring member 110. The hollow portion 112 is filled with a viscous fluid, such as, but not limited to, hydraulic fluid, which operatively couples the internal body 114 to the inner circumferential surface 110A. The internal body 114 is able to move along three directions X, Y, and Z inside the hollow portion 112. The direction X corresponds to the direction of a longitudinal axis L of the load transferring member 110, and the three directions X, Y, and Z are perpendicular to each other.

Although the hollow portion 112 and internal body 114 are shown as cylindrical, it is understood that the internal body 114 and/or hollow portion 112 may alternately have any suitable shape configured for being received within the hollow portion 112.

It is understood that alternately, the internal body 114 may be movable within the hollow portion 112 in only one or only two of the three directions X, Y and Z. For example, the walls 113 may be disposed to contact the internal body 114 such that the internal body 114 is only able to move relative to the transverse directions Y and Z. Other configurations may be used; in a particular embodiment, the internal body 114 is movable relative to the load transferring member 110 at least along the longitudinal direction X.

Figure 5A:
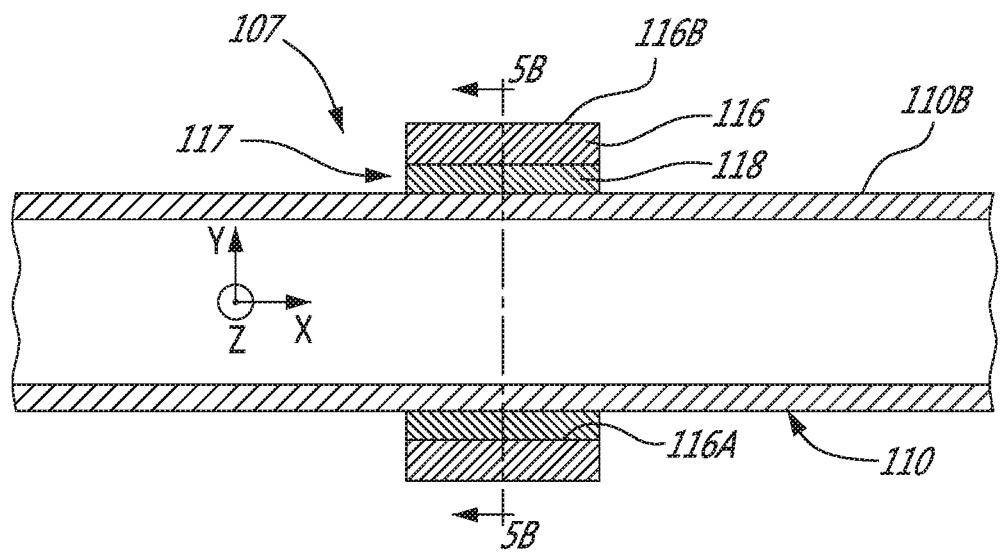
FIG. 5a is a longitudinal cross-sectional view of a portion of the thrust link of FIG. 3 in accordance with another embodiment.
Figure 5B:
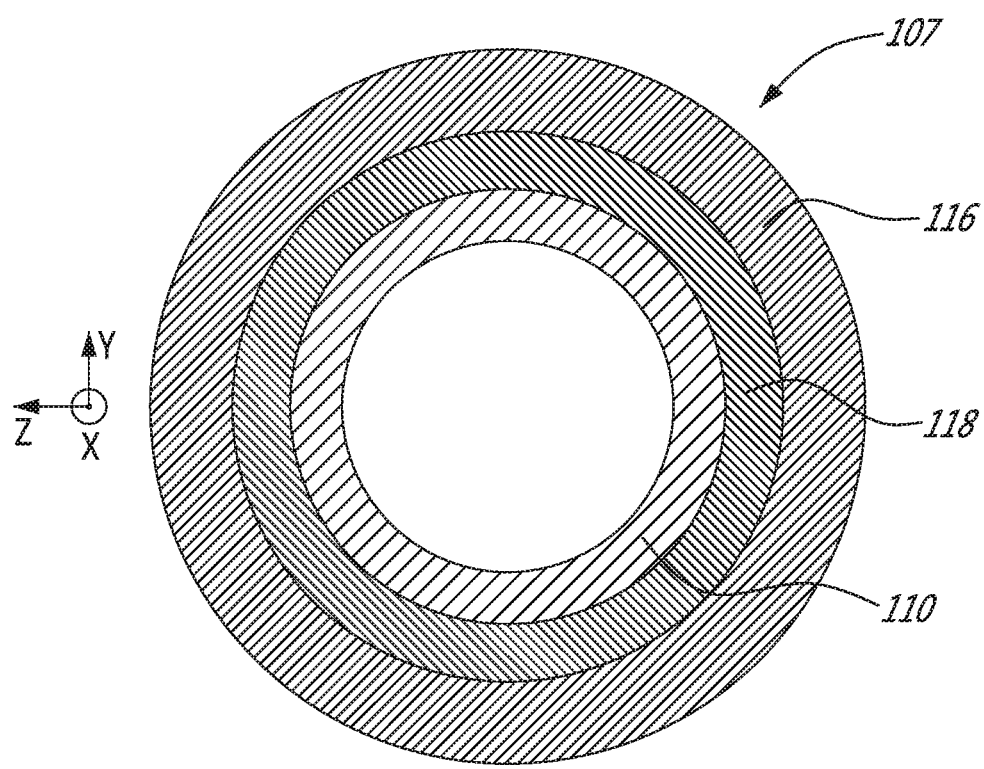

Referring to FIGS. 5a and 5b, another embodiment of a tuned absorber 107 is shown. In this embodiment, the tuned absorber 107 comprises an external body 116 having the shape of a hollow cylinder received around the load transferring member 110. The external body 116 has an inner circumferential surface 116A and an outer circumferential surface 116B. A diameter of the inner circumferential surface 116A is greater than a diameter of an outer circumferential surface 110E of the load transferring member 110 to create an annular gap 117 between the external body 116 and the load transferring member 110. A layer 118 of viscoelastic material is disposed within the annular gap 117 to operatively couple the external body 116 to the outer circumferential surface 110B of the load transferring member 110. In a particular embodiment, the viscoelastic material is silicone rubber. It is understood that any other suitable material may be used. In a particular embodiment, the viscoelastic material has a dynamic modulus (Gdyn) of 100 PSI to 300 PSI and loss angle of 0 to 0.2.

The layer 118 is connected to the inner circumferential surface 116A of the external body 116 and to the outer circumferential surface 110B of the load transferring member 110; the external body 116 is connected to the load transferring member 110 through the viscoelastic layer 118, Accordingly, the contact between the layer 118 and the surface 116A of the external body 116 is free of slippage. The same slippage-free contact is provided between the layer 118 and the surface 110B of the load transferring member 110. Deformation of the layer 118 allows the external body 116 to move relative to the load transferring member 110 along the three perpendicular directions X, Y, and Z.

In another embodiment, the external body 116 may have a shape other than cylindrical, provided that the external body 116 may be disposed around the load transferring member 110 and that enough space is present to receive the layer 118 therebetween. It is understood that alternately, the external body 116 may be movable relative to the load transferring member 110 in only one or only two of the three directions X, Y and Z. For example, features may be disposed around the load transferring member 110 to limit the movement of the external body 116. In a particular embodiment, the external body 116 is movable relative to the load transferring member 110 at least along the longitudinal direction X.

Figure 6A:
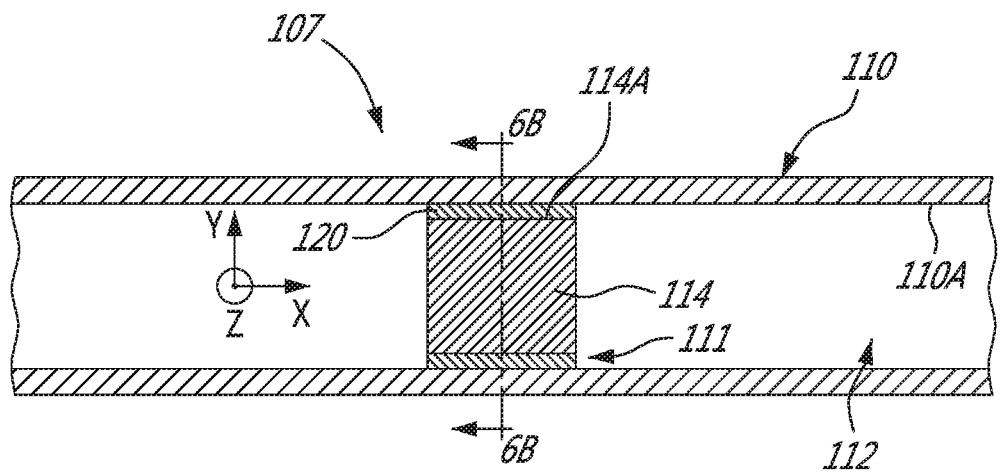
FIG. 6a is a longitudinal cross-sectional view of a portion of the thrust link of FIG. 3 in accordance with yet another embodiment.
Figure 6B:
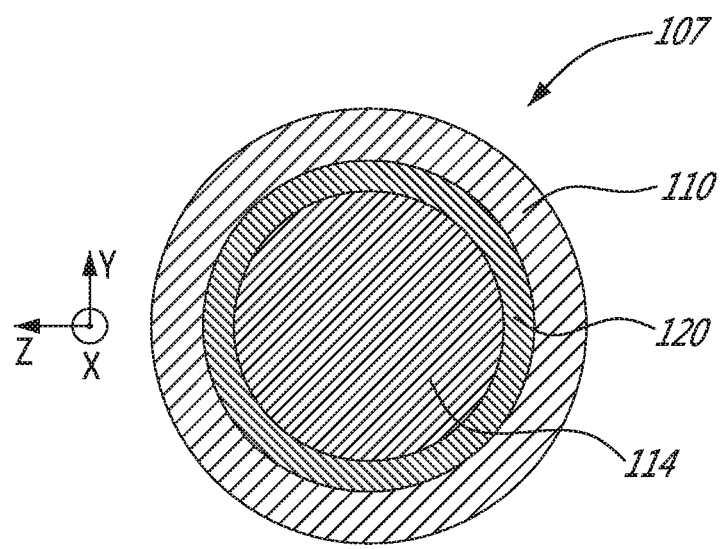

Referring to FIGS. 6a-6b, another embodiment of a tuned absorber 107 comprising an internal body 114 is shown, where elements similar to that of the tuned absorber of FIGS. 4a-4b are identified by the same reference numerals. In this particular embodiment, a layer of viscoelastic material 120 is disposed within the annular gap 111 defined between the internal body 114 and the inner circumferential surface 110A of the load transferring member 110 to operatively couple the internal body 114 to the inner circumferential surface 110A. Similarly to the layer 118 of FIGS. 5a-5b, the layer 120 is connected to the inner circumferential surface 110A of the load transferring member 110 and to the external surface 114A of the internal body 114, so that the contact between the layer 120 and the surfaces 110A, 114A is free of slippage, Deformation of the layer 120 allows the internal body 114 to move relative to the load transferring member 110 at least along the longitudinal direction X, and in the embodiment shown along the three perpendicular directions X, Y, and Z. The layer 120 may be made of the same materials discussed above for the layer 118.

In operation and in a particular embodiment, the thrust link 106 is subjected to the dynamic loads generated by the engine 6 and the load transferring member 110 moves (e.g. vibrates) in reaction to those loads. The damping member of the tuned absorber 107, i.e. the internal body 114 or the external body 116, resist movement because of inertia, thus creating a relative movement between the load transferring member 110 and the damping member 114, 116. The damping member 114, 116 connected to the load transferring member 110 through the viscous fluid or through the viscoelastic layer 118, 120 acts as a mass-spring system damping the vibrations having the particular frequency for which the tuned absorber is tuned. In a particular embodiment, this frequency is outside the range of the natural frequencies of the load transferring member 110.

In a particular embodiment, the frequency for which the tuned absorber 107 formed by the damping member 114, 116 and the damping material (viscous fluid or layer 118, 120) is tuned is a frequency value within the audible range, and corresponds to the frequency of a noise (e.g. tonal noise) to be absorbed. In a particular embodiment, the frequency has a value of at least 50 Hz. In a particular embodiment, the frequency is within the range extending from 50 Hz to 100 Hz, which may correspond for example to the frequency of the tonal noise produced by the low pressure (e.g. fan) shaft of the engine 6. In a particular embodiment, the frequency is within the range extending from 100 Hz to 350 Hz, which may correspond for example to the frequency of the tonal noise produced by the high pressure (core) shaft of the engine 6. Other values are also possible.

In a particular embodiment, the tuned absorber 107 is tuned to the desired frequency by changing the properties of the layer 118, 120 or of the viscous fluid, for example by selecting a particular viscoelastic material for the layer 118, 120 or a particular viscous fluid having desired properties (e.g. viscosity, dynamic modulus, loss angle). The tuned absorber 107 can also be tuned to the desired frequency by varying the mass of the damping member 114, 116, and/or by increasing or decreasing a thickness of the annular gap 111, 117 (and accordingly of the layer 118, 120 when used, or volume of viscous fluid present in the gap 111, 117 when used). Tuning is also possible by varying more than one of the above listed parameters simultaneously.

In some embodiments, it may be required to provide the thrust link 106 with a tuned absorber 107 that is configured to absorb two predetermined frequencies associated for example with the high pressure shaft and the low pressure shaft of the engine. Examples of such tuned absorbers are provided in the following.

Figure 7:
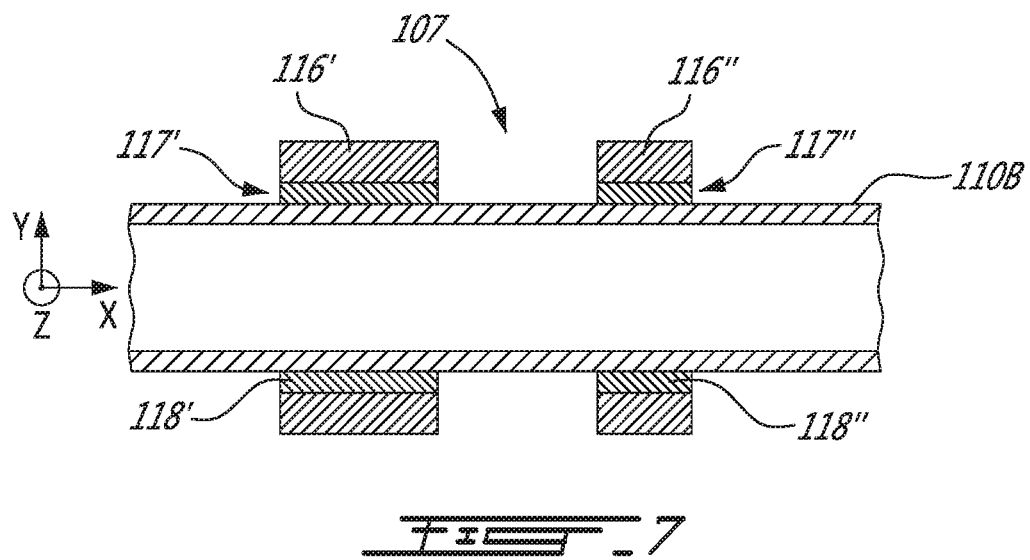
FIGS. 7-10 are longitudinal cross-sectional views of portions of the thrust link of FIG. 3 in accordance with different embodiments.

Referring to FIG. 7, an embodiment of a tuned absorber 107 comprising two bodies is shown. In this particular embodiment, the tuned absorber 107 comprises two external bodies 116' and 116" both disposed around the load transferring member 110, with respective annular gaps 117' and 117" being defined between the bodies 116', 116" and the load transferring member 110. Each external body 116', 116" is connected to the load transferring member 110 through a respective viscoelastic layer 118', 118", similarly to the single body embodiment of FIGS. 5a-5b. To tune the absorber to absorb two different frequencies, the external bodies 116', 116" may have different masses and/or the viscoelastic layers 118', 118" may have different properties (e.g. material properties and/or thicknesses). The different material properties of the viscoelastic layers 118', 118" can be obtained by using different materials or by changing a manufacturing process of a given material. Independent deformation of the layers 118', 118" allows both external bodies 116', 116" to move independently of one another relative to the load transferring member 110 along at least the longitudinal direction X, and in a particular embodiment along the three perpendicular directions X, Y, and Z.

Figure 8:
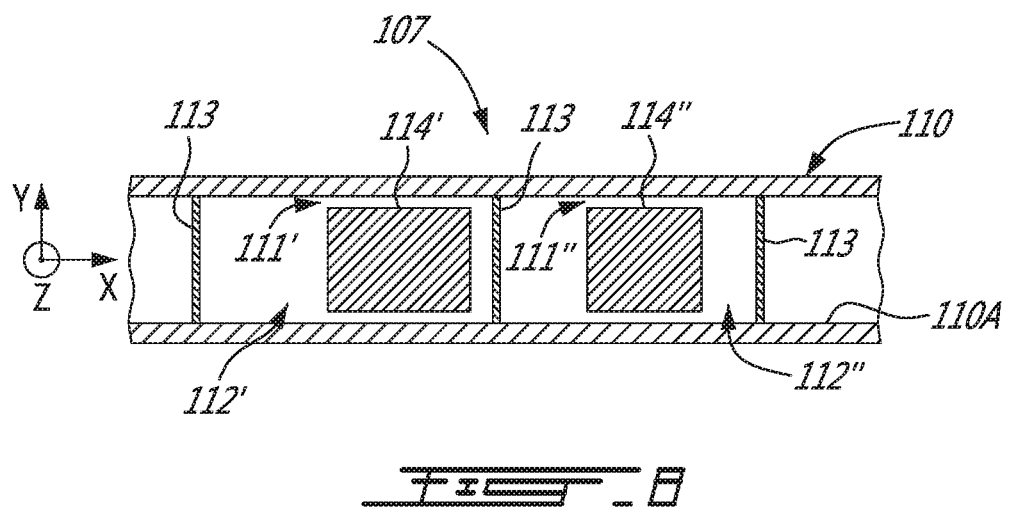

Referring to FIG. 8, another embodiment of a tuned absorber 107 comprising two bodies is shown. In this case, the bodies are internal bodies 114', 114" each disposed within a respective hollow portion 112', 112" of the load transferring member 110, with the hollow portions 112', 112" being separately defined between internal transverse walls 113. Alternately, both internal bodies 114', 114" may be disposed within a common hollow portion. A respective annular gap 111', 111" is defined between each internal body 114', 114" and the inner surface 110A of the load transferring member 110. To tune the absorber to absorb two different frequencies, the internal bodies 114', 114" may have different masses and/or the fluids filling the hollow portions 112', 112" may have different properties (e.g. different viscosities) and/or the gaps 111', 111" may have different thicknesses. Both internal bodies 114', 114" are free to move independently of one another relative to the load transferring member 110 along at least the longitudinal direction X, and in a particular embodiment along the three perpendicular directions X, Y, and Z.

Figure 9:
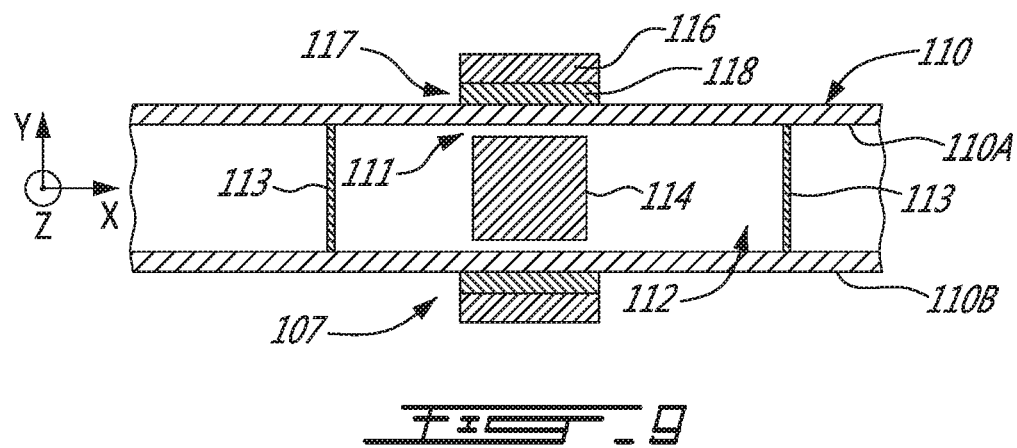

Referring to FIG. 9, an embodiment of a tuned absorber 107 comprising an internal body 114 and an external body 116 is shown. In this particular embodiment, the internal body 114 is disposed within the hollow portion 112 defined between the transverse walls 113, and surrounded by viscous fluid. An annular gap 111 is defined between the internal body 114 and the inner surface 110A of the load transferring member 110, through which the fluid can circulate. The external body 116 is disposed around the load transferring member 110, and another annular gap 117 is defined between the external body and the outer surface 110B of the load transferring member 110. A layer 118 of viscoelastic material is connected to the outer surface 110B of the load transferring member 110 and to the external body 116 to fill the annular gap 117. Both bodies 114, 116 are free to move independently of one another relative to the load transferring member 110 along at least the longitudinal direction X, and in a particular embodiment along the three perpendicular directions X, Y, and Z. The tuned absorber 107 can be tuned to the predetermined frequency as set forth above.

Figure 10:
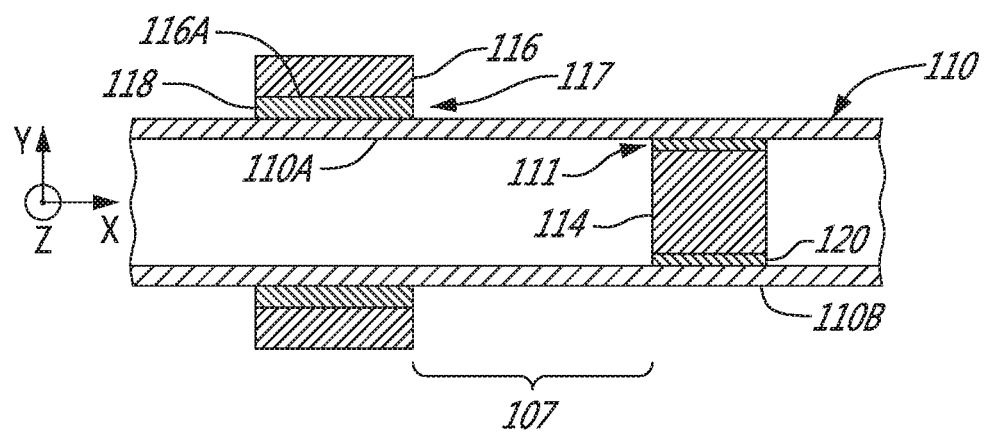

Referring to FIG. 10, another embodiment of a tuned absorber 107 comprising an external body 116 and an internal body 114 is shown. In this particular embodiment, the annular gap 111 between the internal body 114 and the inner surface 110A of the load transferring member and the annular gap 117 between the external body 116 and the outer surface 110B of the load transferring member 110 are each filled with a respective layer 120, 118 of viscoelastic material. The viscoelastic layer 118 within the annular gap 117 is connected to the external body 116 and to the outer surface 110B of the load transferring member 110. The layer 120 disposed within the annular gap 111 is connected to the internal body 114 and to the inner surface 110A of the load transferring member 110. Both bodies 114, 116 are free to move independently of one another relative to the load transferring member 110 along at least the longitudinal direction X, and in a particular embodiment along the three perpendicular directions X, Y, and Z. The tuned absorber 107 can be tuned to the predetermined frequency as set forth above, for example similarly to the tuned absorber of FIG. 7.

It is understood that any other combinations of internal and/or external damping members, using viscous fluid and/or viscoelastic material, may be used without departing from the scope of the present disclosure. Also, a particular embodiment of a tuned absorber may comprise more than two bodies and may be tuned to absorb more than two predetermined frequencies.

Accordingly, in a particular embodiment, the transfer of noise generated by the engine 6 to the aircraft 1 is reduced by coupling the tuned absorber 107 to the load transferring member 110 of the thrust link 106 intermediate the opposed ends 108, 109, and configuring the tuned absorber 107 to be tuned to absorb at least one predetermined frequency of the noise from the engine 6.

As set forth above, configuring the tuned absorber 107 can include one or more of selecting a mass of the damping member 114, 114', 114", 116, 116', 116" of the tuned absorber 107, selecting properties of a viscoelastic layer connecting the damping member of the tuned absorber 107 to the load transferring member 110, and/or selecting properties of a viscous fluid operatively coupling the damping member of the tuned absorber 107 to the load transferring member 110.

While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An assembly for connecting an engine to an aircraft, comprising:
 a first support configured to be structurally connected to the engine;
 a second support configured to be structurally connected to the aircraft; and
 a thrust link including:
  a load transferring member having opposed ends each connected to a respective one of the first and second supports for transferring engine thrust loads from the engine to the aircraft along a longitudinal axis of the load transferring member, the opposed ends having a fixed position relative to each other; and
  a tuned absorber coupled to the load transferring member intermediate the opposed ends, the tuned absorber tuned to absorb engine noise of at least one predetermined frequency;
 wherein:
  the tuned absorber has a damping member operatively coupled to the load transferring member and movable relative to the load transferring member at least along the longitudinal axis;
  the damping member is disposed within a hollow portion of the load transferring member;
  the hollow portion is completely filled with a viscous fluid surrounding the damping member; and
  the viscous fluid operatively couples the damping member to an inner surface of the load transferring member.

2. The assembly as defined in claim 1, wherein the tuned absorber further comprises a viscoelastic layer interconnecting the damping member and the load transferring member.

3. The assembly as defined in claim 1, wherein the tuned absorber includes two bodies operatively coupled to the load transferring member and tuned to absorb noise of a respective one of two different predetermined frequencies.

4. The assembly as defined in claim 3, wherein the two bodies have different masses.

5. The assembly as defined in claim 3, wherein the two bodies are connected to the load transferring member through a respective one of two viscoelastic layers having different properties.

6. The assembly as defined in claim 1, wherein the damping member is movable relative to the load transferring member along three directions perpendicular relative to each other.

7. The assembly as defined in claim 1, wherein the predetermined frequency is at least 50 Hz.

8. A thrust link for transferring engine thrust loads from an engine to an aircraft, comprising:
 a load transferring member having opposed ends configured for respectively engaging engine and aircraft supports to transfer engine thrust loads from the engine to the aircraft along a longitudinal axis of the load transferring member, the ends having a fixed position relative to each other; and
 a tuned absorber having a damping member operatively coupled to the load transferring member and movable relative to the load transferring member at least along the longitudinal axis to absorb noise of at least one predetermined frequency;
 wherein:
  the damping member is disposed within a hollow portion of the load transferring member;
  the hollow portion is completely filled with a viscous fluid surrounding the damping member; and
  the viscous fluid operatively couples the damping member to an inner surface of the load transferring member.

9. The thrust link as defined in claim 8, wherein the tuned absorber further comprises a viscoelastic layer interconnecting the damping member and the load transferring member.

10. The thrust link as defined in claim 8, wherein the damping member includes two bodies operatively coupled to the load transferring member and tuned to absorb noise of a respective one of two different predetermined frequencies.

11. The thrust link as defined in claim 8, wherein the predetermined frequency is at least 50 Hz.

12. The assembly as defined in claim 1, wherein the hollow portion is defined between two walls oriented transversely to the longitudinal axis and containing the viscous fluid.

* * * * *